United States Patent [19]

Turner

[11] Patent Number: 5,154,149
[45] Date of Patent: Oct. 13, 1992

[54] ROTARY MOTOR/PUMP

[76] Inventor: Leonard W. Turner, 2313 Carson St., Santa Rosa, Calif. 95403

[21] Appl. No.: 680,911

[22] Filed: Apr. 5, 1991

[51] Int. Cl.$^5$ .................... F02B 53/00; F03C 2/08; F04C 2/18; F04C 18/18
[52] U.S. Cl. .................................. 123/249; 418/206
[58] Field of Search .............. 123/249, 238; 418/205, 418/206

[56] References Cited

U.S. PATENT DOCUMENTS

| | | | |
|---|---|---|---|
| 149,664 | 4/1974 | LaFrance | 418/205 X |
| 688,616 | 12/1901 | Ferguson | 418/206 X |
| 1,085,290 | 1/1914 | Pagel | 418/205 X |
| 1,407,496 | 2/1922 | Storey | 418/206 X |
| 1,756,977 | 5/1930 | Enlind | 418/206 |
| 3,392,676 | 7/1968 | Bizier | 418/206 |
| 3,941,521 | 3/1976 | Weatherston | 418/206 |
| 4,145,168 | 3/1979 | Smith | 418/206 |
| 4,390,331 | 6/1983 | Nachtrieb | 418/206 |
| 4,702,206 | 10/1987 | Harries | 418/206 |

Primary Examiner—Michael Koczo

[57] ABSTRACT

A rotary motor/pump operating from pressurized elastic fluids (steam, and gases of all types), and a pump for either elastic or incompressible liquid fluids. With a combustion chamber (52) installed, motor (20) will also operate as a gas engine. The motor (20) comprises a casing (22) surrounding at least one pair of rotors (30) mounted on parallel shafts (28). The motor (20) is provided with inlet port (24) which admits high pressure steam or gas. Pressure is confined and applied continously and simultaneously to two outwardly extending lobes (34) which instantly apply torque to shafts (28). Cooperating cavities (40) permit lobes (34) to pass through the adjacent rotor (30) and maintain a seal during the passage. Timing gears (32) are attached to shafts (28) and maintain synchronization between lobes (34) and cavities (40). The motor (20) may be converted into a multistage compound steam engine by conducting exhaust gases from outlet ports (26) into the inlet ports of following stages of larger volume, and used with a condenser to enhance efficiency. Detailed functional analysis of the lobe/cavity relationships are included.

11 Claims, 8 Drawing Sheets

ROTARY MOTOR/PUMP

FIELD OF THE INVENTION

This invention relates to rotary motors, specifically to elastic fluid and gas driven rotary motors, and pumps for both elastic and incompressible fluids.

BACKGROUND OF THE INVENTION

Heretofore, reciprocating motors and turbines have converted the potential energy of pressurized steam and gases into mechanical energy.

Reciprocating motors lack efficiency because of the energy wasted overcoming the inertia of parts which move back and forth. Turbines are inefficient because the working fluid ricochets off of the blades instead of having the pressure confined and forcing the blades through their cycle. The result is that it is necessary to have many (at times thousands) of blades to receive the small forces applied and sum them at the shaft. This makes turbines expensive and complex structures of many parts. Each blade must be of critical dimension and be dynamically balanced for high speed operation. This makes them costly to make and install. Turbines cannot start from dead stop and deliver full power at low speeds. They require appreciable time to reach the extreme speeds at which they operate. This makes them not suitable for lower speed power demands when high-torque power is needed from a dead stop condition. Examples of this need are: submarines, military vehicles, ships, trains, trucks, automobiles, earth moving machinery, and shop motors. The high-speed operation of turbines requires gear reduction systems. This invention eliminates the need for expensive gear reduction and transmission systems.

OBJECTS OF THE INVENTION

Accordingly, several specific objects and advantages of my invention are to provide:

a. a motor which is smaller, lighter, and more powerful for it's size than reciprocating motors, turbines, and other rotary motors;

b. a much simpler motor, which is cheaper to manufacture than complex turbines and reciprocating motors due to it's design simplicity and small number of parts;

c. a motor which delivers full power instantly upon demand and meets a need not met by turbines and reciprocating motors;

d. a motor which satisfies the broadest spectrum of use, to include: power station prime movers, ships, submarines, automobiles, trucks, trains, and shop motors;

e. a motor which confines the pressurized fluid and applies it directly to moving lobes, and is thus more efficient than turbines;

f. a motor which delivers full power at low speeds as well as high speeds, and thus eliminates the need for the expensive gear reduction systems required by both reciprocating motors and turbines; and g. a motor which requires less critical dynamic balancing and has lower centripetal loading on the parts than turbines.

SUMMARY OF INVENTION

These and other objects are achieved by the present invention which provides a motor comprised of a casing with inlet and outlet ports, surrounding a plurality of rotors. The rotors are bearing mounted on parallel shafts and are provided with outwardly extending lobes and voids or cavities. These cavities permit the lobes to return from the low to the high pressure zone and maintain a pressure seal. Timing gears, timing chains or the like ensure that the rotors counter-rotate at the same angular velocity. At no time is there contact between the rotors or between the lobes and the cavity surfaces. The only metal-to-metal contact is between the shafts and their bearing supports and between the timing gears.

Further objects and advantages of my invention will become apparent from a consideration of the drawings and their ensuing description.

BRIEF DESCRIPTION OF THE DRAWINGS

The preferred embodiment of my invention is described in detail below with reference to drawings which illustrate the preferred mode of operation.

DESCRIPTION OF PREFERRED EMBODIMENTS

Figure 1:
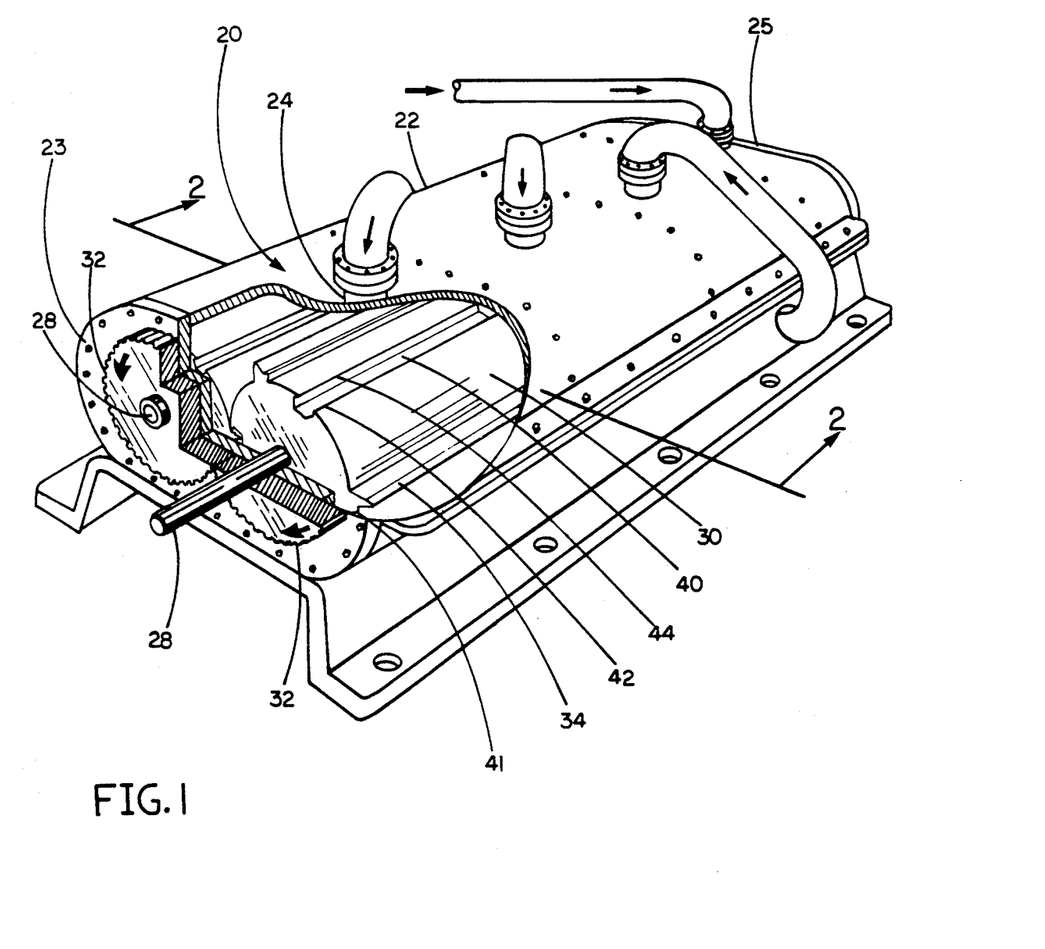
FIG. 1 is an open-view perspective drawing of the preferred embodiment—a multiple stage steam motor suitable for heavy power generation or marine propulsion.
Figure 2:
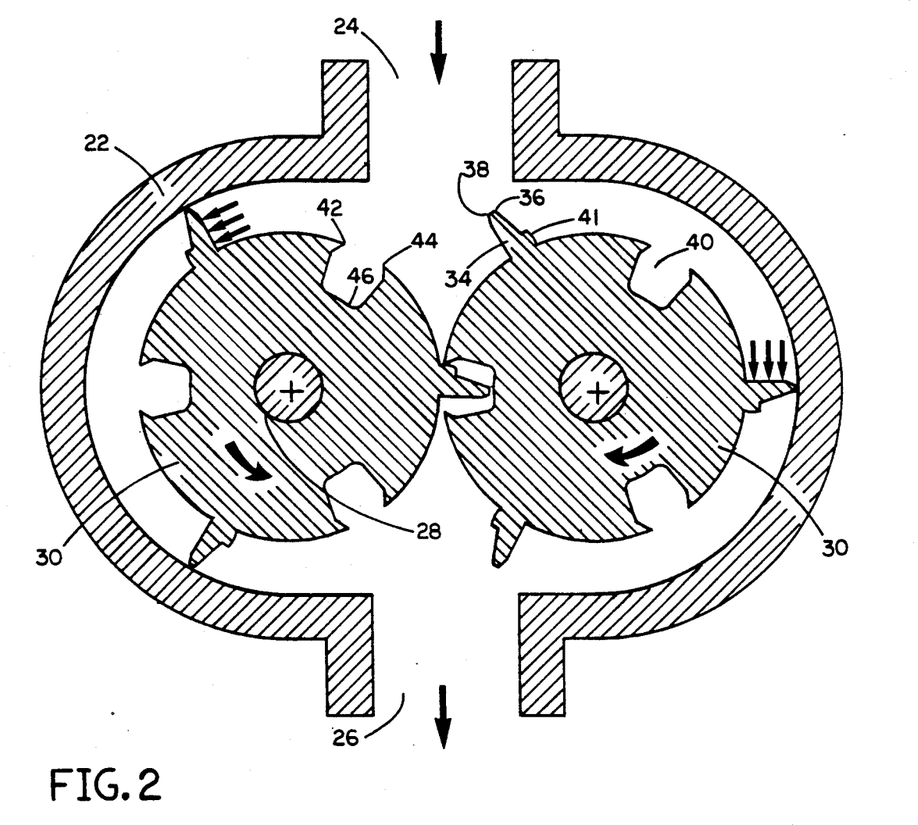
FIG. 2 is a diagrammatic sectional view of one section of the motor shown in FIG. 1 with the timing gears and front half of the section removed.

Referring to FIGS. 1, 2, 10, and 14 of the drawings, two equally important embodiments of the present invention are shown. While FIGS. 1 and 2 show a multiple stage, twin power rotor steam motor, FIG. 14 shows the gas motor application.

Figure 3:
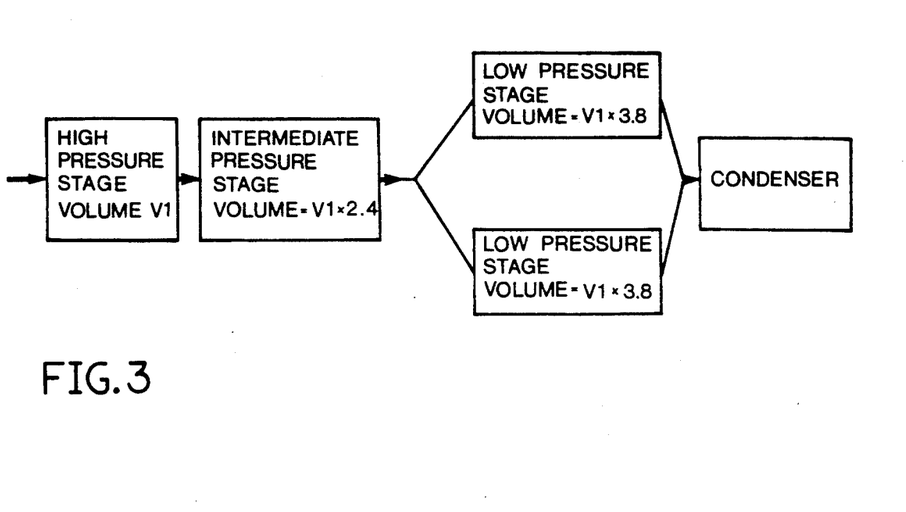
FIG. 3 is a block diagram representing the stage sequence of the multiple stage motor shown in FIG. 1 showing two parallel sections comprising the low pressure stage.

The preferred embodiment shown in FIGS. 1, 2, and 3 is a steam motor divided by inner walls (not shown) into four separate compartments. FIG. 2 represents a sectional view from the front of the center of any of these compartments.

FIG. 1 shows a typical motor 20. A casing 22, with a fore wall 23, and an aft wall 25 surrounding the internal parts. Two timing gears 32 are shown mounted on two shafts 28. Timing gears 32 have equal diameters (1:1 ratio), and herringbone helical gears are preferred to offer quiet, smooth, thrust-free operation. An inlet port 24 is provided for each separate section of motor 20. The motor 20 shown is partitioned between the high, intermediate, and low pressure stages.

FIG. 2 shows casing 22 surrounding one or more pairs of rotors 30, mounted on parallel shafts 28. Rotors 30 have a plurality of cavities 40 and outwardly extending lobes 34 which are synchronized by timing gears 32 to cause lobes 34 to meet and pass through cavities 40 in operation. Lobes 34 move in the annular space between rotors 30 and casing 22.

In FIG. 2, while three lobes 34 and three cavities 40 are shown on each rotor 30, any number of lobes 34 and corresponding number of cavities 40 may be used. However, three evenly spaced lobes and cavities on each rotor 30 whose centerlines are separated by 60 degrees are recommended because this arrangement causes two lobes 34 to be continuously powered.

Figure 6A:
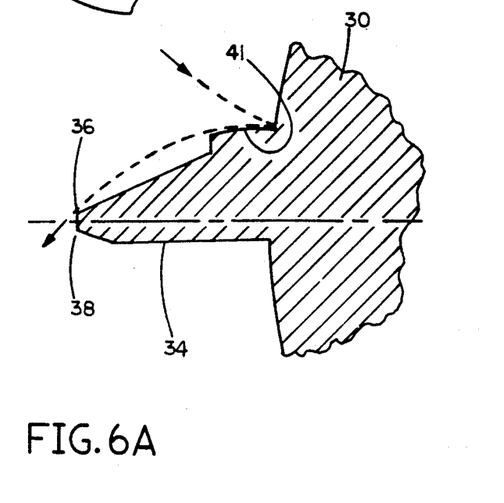
FIG. 6A shows the path followed by a cavity leading tip around the lobe during the excursion depicted in FIGS. 4A through 4I.

Referring to FIG. 6A, lobe 34 projects outwardly from rotor 30 and has a height equal to the depth of the cavity 40 through which it passes. The outer end of lobe 34 is bounded by an arc centered in the center of rotor 30, and is terminated by a leading tip 36 and a lagging tip 38.

Figure 6B:
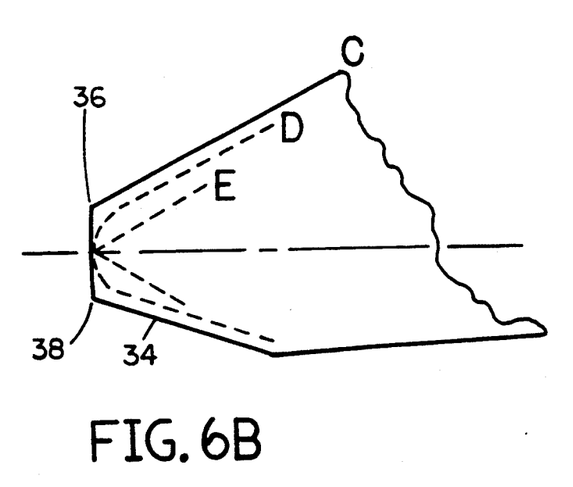
FIG. 6B is an enlarged view of the outer end of the lobe shown in FIG. 6A.

FIG. 6B is an enlarged view of the outer end of the lobe shown in FIG. 6A. The apex or lobe end may be an arc segment centered on the center of rotor 30 as in shape C, or may blunted or more rounded as in D, or may be pointed as in E. Shapes ranging from those shown in E through C are workable, however, the shape depicted by C is recommended.

Referring to FIG. 6A, the distance between lobe tips is kept to a minimum and the bodies of lobes are kept as narrow as structural integrity will permit. This minimizes the angular span or width of cavities 40, thus minimizing the volume of working fluid wasted when cavities 40 reach an outlet port 26. Lobe 34 has a lobe shoulder 41 which is an epicycloidal curve at the base of the leading side. The purpose of lobe shoulder 41 is to provide a sealing surface for cavity leading tip 42 to traverse. Lobe 34 should be reduced in thickness to the minimum allowable by operating pressures to lower the centripetal loading at higher speed operation. The center line in FIG. 6A represents the bounds of a typical lagging side for a high speed lobe 34.

Figure 4A:
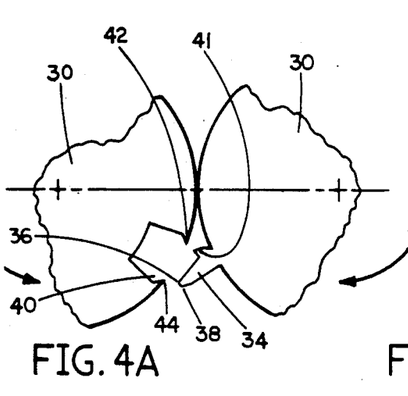
FIGS. 4A through 4I illustrate the excursion of the preferred lobe through a cavity in a stage of the preferred embodiment.

FIG. 4A shows a cavity 40 formed with essentially straight-lined sides to facilitate manufacture. However, referring to FIG. 5, curved shaped sides which closely parallel path A made by lobe leading tip 36 and path B made by lobe lagging tip 38 are recommended to minimize cavity volume. The cavity sides are shaped to avoid lobe tip paths. Cavity base 46 is formed by an arc segment made from the center of rotor 30. Cavity leading tip 42 and cavity lagging tip 44 are located at the entrance of cavity 40. The cavity tips may be blunted somewhat to extend their service life.

Figure 7:
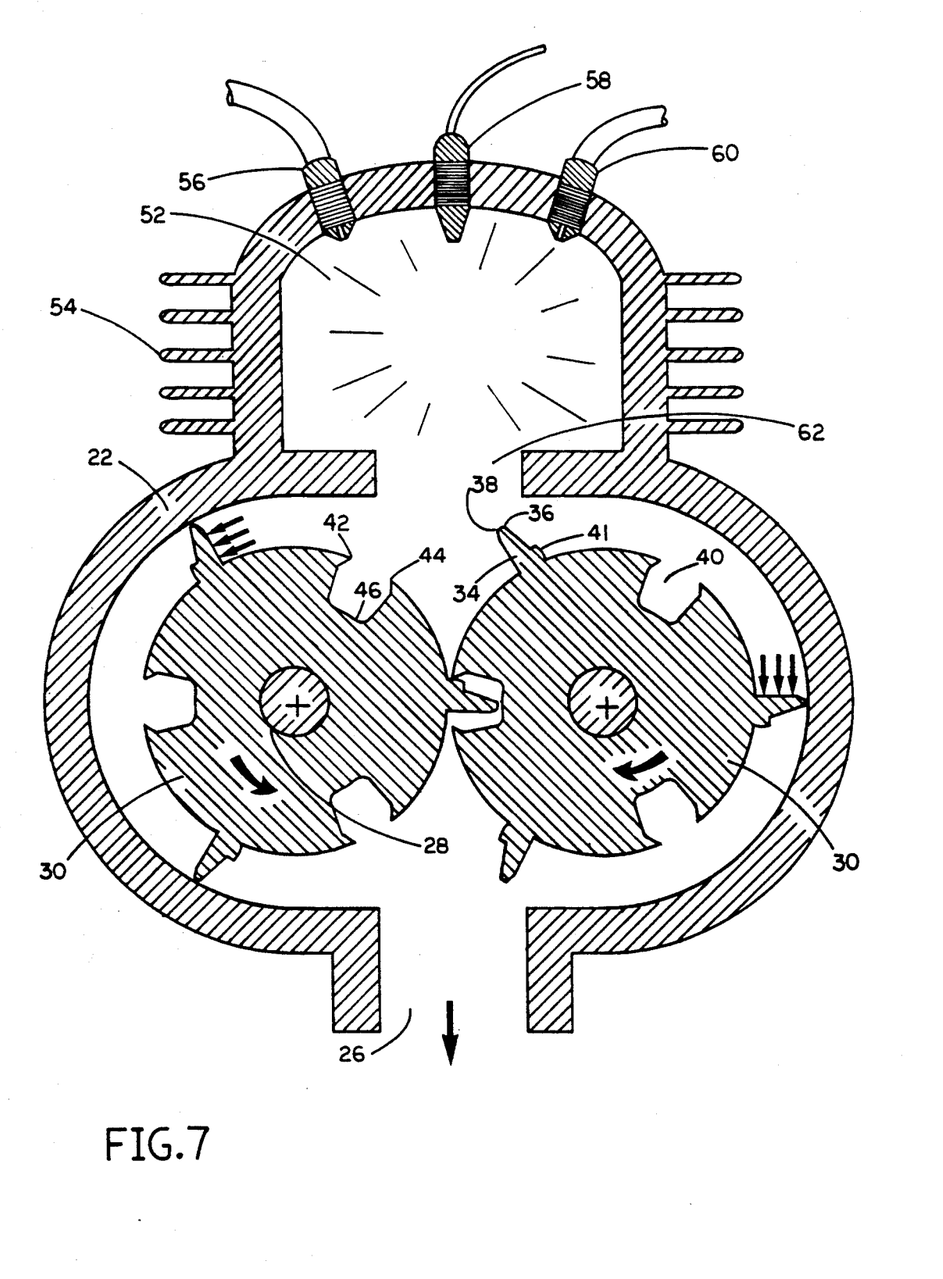
FIG. 7 is a diagrammatic sectional view of the gas motor variation.

Referring to FIG. 7, the gas motor variation is shown in which a combustion chamber 52 is surrounded by casing 22 and positioned to communicate with the input to motor 20 through an exhaust port 62.

Combustion chamber 52 has several cooling fins 54 protruding outwardly. Three parts extend through casing 22 into combustion chamber 52: a fuel inlet 56, an air/oxygenic inlet 60, and an igniter 58. Igniter 58 may be either a high-tension spark plug or glow plug.

While FIG. 7 shows fuel inlet 56 and air/oxygenic inlet 60, some fuels require only one inlet for both fuel and oxygen introduction into combustion chamber 52. Outlet port 26 may communicate with an inlet port 24 of a subsequent stage in which further combustion reduces exhausted pollutants.

Referring to FIG. 2, the metallurgical requirements for casing 22, rotors 30, and lobes 34 are identical to those for steam turbines operating at the same temperatures and pressures.

Referring to FIG. 7, the metallurgical requirements for casing 22 are identical to those for gas turbines operating at the same pressures and temperatures.

POWER CALCULATIONS

One can appreciate the unusual power of this device by calculating the horsepower of a small unit with the following dimensions:

Rotor diameter - 15.24 cm (6.0 in)
Lobe height - 2.54 cm (1.0 in)
Lobe length - 45.72 cm (18.0 in)
Therefore:
Lever arm = 8.89 cm (3.5 in) (Radius + 0.5 × lobe height)
Steam pressure - 28.123 kg/cm$^2$ (400 lb/in$^2$)
rpm - 2000
Formula: hp = torque × angular velocity
Combined area of 2 lobes = 232.26 cm$^2$ (36 in$^2$)
Total force applied - 36 × 400 = 14,400 lb $$\text{Torque} - \frac{14,400 \times 3.5}{12} = 4,200 \text{ ft/lb}$$

Angular velocity = 2000 rpm = 33.33 rps × 2 Pi rad
Substitution:
hp = 4,200 ft/lb × 33.33 × 2 Pi = 279,972 Pi ft/lb/sec when divided by $\frac{550 \text{ ft/lb/sec}}{hp}$ = 509.04 Pi hp = 162 hp Over 150 horsepower delivered from a motor approximately 55.88 cm×40.64 cm×25.4 cm (22 in×16 in×10 in), operating from 400 lb/in$^2$ reveals the outstanding power of this device.

The horsepower is directly proportional to the height of lobe 34, the operating pressure, and the rpm. Doubling any of these factors will double the horsepower. This motor operating at 3000 lb/in$^2$ has a calculated power output of 1,215 hp. This is extraordinary power output from a motor less than two feet in length! With a 50% friction loss this would still be over 607 hp.

An epicycloid is a curve traced by a point on the circumference of a circle that rolls on the outside of a fixed circle without slippage.

Figure 5:
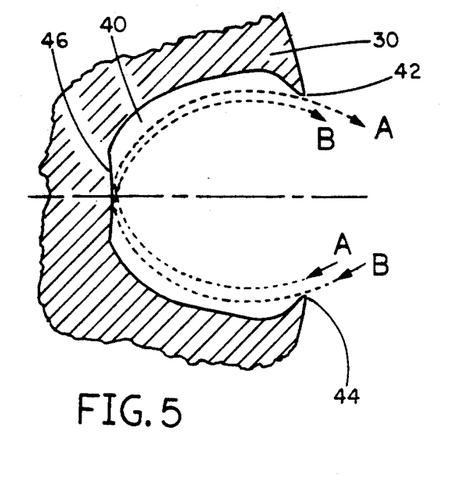
FIG. 5 shows a cavity with curved sides and blunted tips. It also shows the paths followed by the leading and lagging lobe tips during the excursion through the cavity illustrated in FIGS. 4A through 4I.

Referring to FIG. 5, path A made by lobe leading tip 36 and path B made by lobe lagging tip 38 describe modified epicycloids, as the lobe tips are points beyond the circumference of rotor 30 and describe curves inside of the cavity 40. These curves will be referred to as E paths.

To design cavities 40, it is necessary to know the exact size, shape, and position of the paths of the two lobe tips. A means is required for producing accurate design drawings of these paths. The following procedure produces full scale or larger drawings of the profile or end view of the path taken by a single lobe tip when two rotors 30 of equal diameters mounted on parallel shafts with circumferences in near contact, counterrotate at the same rate.

Maximum accuracy is required in every step of this procedure. Draw the figure as much up scale as practical and use a large protractor. Computer aided drafting techniques are recommended.

Figure 8A:
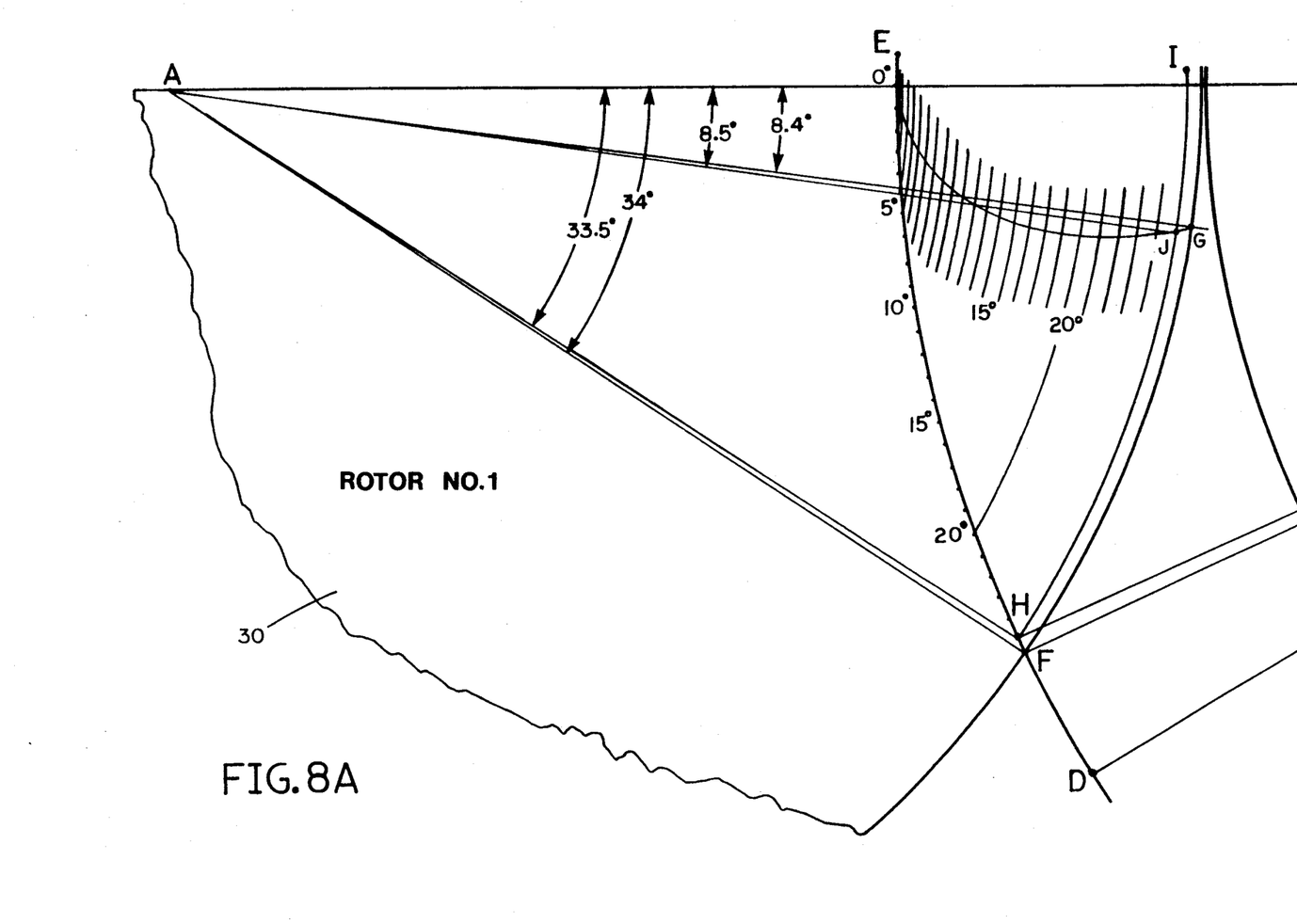
FIGS. 8A and 8B show the construction procedure for drawing the paths made by the lobe tips.
Figure 8B:
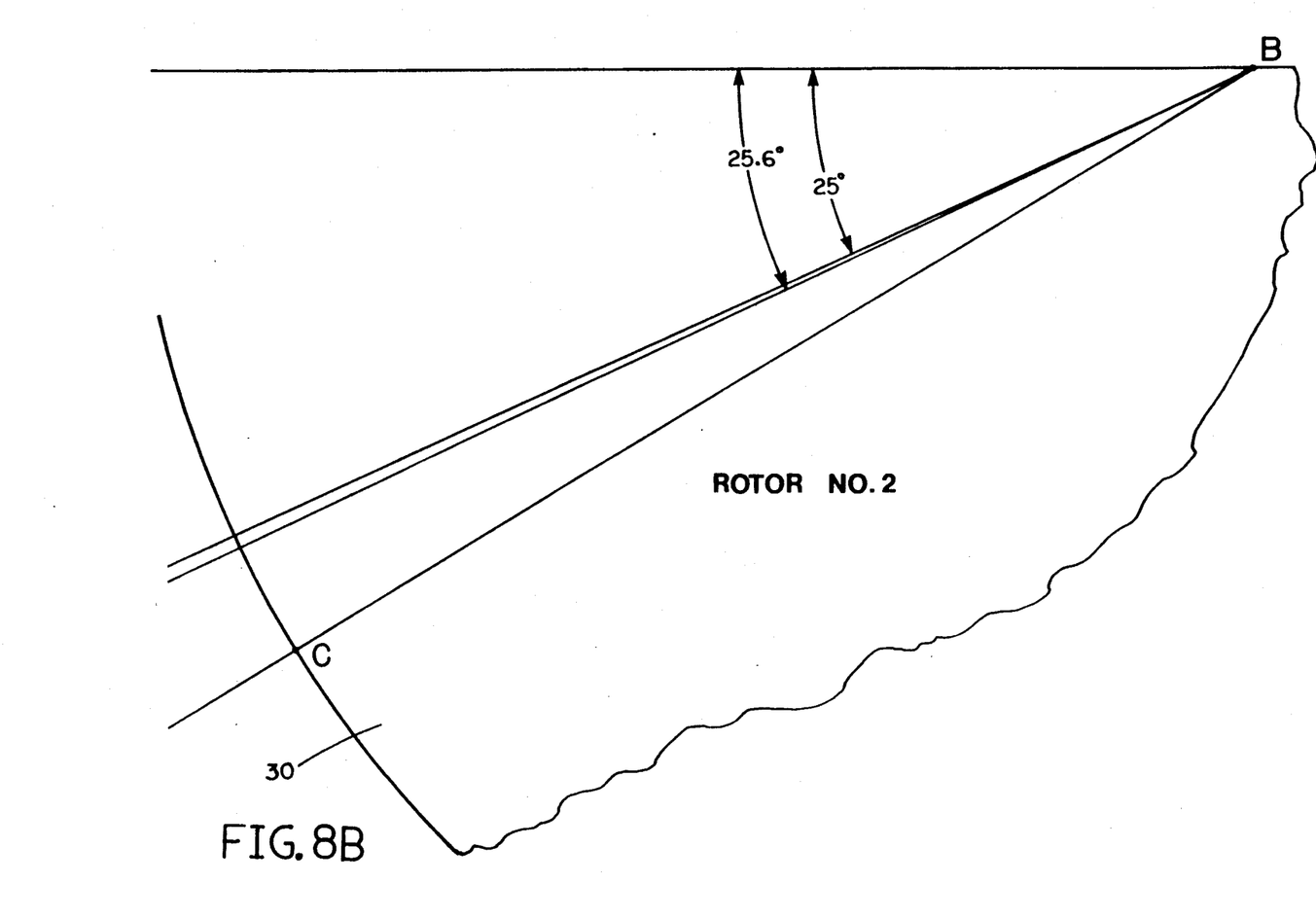

1. Refer to FIGS. 8A and 8B and draw two circles to scale representing the end view of the two rotors 30 used as shown. Separate the circles by an amount equal to the operating clearance selected.

2. Draw zero reference line AB connecting the two rotor centers.

3. Draw line BCD—a radial extension of rotor No. 2. Make distance CD equal to the height of the lobe 33 selected.

4. With line DB as a radius and B as the center, draw arc DE through rotor No. 1. This is the path of lobe tip D with Rotor No. 1 stationary and Rotor No. 2 rotating clockwise.

5. The point of intersection between arc DE and the circumference of Rotor No. 1 is point F. This represents the point of intrusion of the lobe tip into Rotor No. 1.

6. Draw line FB and measure angle ABF. (25.6 deg in the example)

7. Draw line AF and measure angle FAB. (34.0 deg in the example) If line FB were rotated clockwise 25.6 deg it would rest on zero reference line AB. If line AF were rotated counter-clockwise the same amount (25.6 deg), it would fall 8.4 deg below zero reference line AB.

8. Draw line AG to form an 8.4 deg angle GAB and intersect the circumference of Rotor No. 1 as shown. Point G is the position of point F after both Rotors No. 1 and 2 have counter-rotated 25.6 deg and represents the position of point F when lobe tip D rests on the zero reference line.

9. In like manner, select an angle of depression smaller than the intrusion angle (25 deg in the example) and draw radial extension BH to intersect arc DE and form the 25 deg angle ABH.

10. Draw line AH.

11. Measure angle HAB. (33.5 deg in example)

12. With A as a center, draw an arc HI to intersect zero reference line AB.

13. From 33.5 deg (angle HAB) subtract 25.0 deg (depression angle of the lobe). The remainder is 8.5 deg.

14. Draw line AJ to intersect arc HI and form angle JAB of 8.5 deg as shown. This is the position point H will assume when both rotors have counter-rotated 25.0 deg (lobe depression angle for point H) and lobe tip D rests on zero reference line AB.

Note: The angles of lobe depression shown on Rotor No. 1 represent the angular movement of the lobe tip tip inside Rotor No. 1 at these given angles.

By moving these tip locations the angular amount of the corresponding depression angle, Rotor No. 1 is effectively rotated counter-clockwise the same amount that Rotor No. 2 is rotated clockwise. The resulting series of plotted points near the zero reference line is a coherent plot of all of the points selected at the instant the lobe tip rests on the zero reference line. In other words, all of the points are individually rotated to positions which align them at the same instant in time. The time point selected is the instant the lobe tip rests on the zero reference line.

15. In like manner, select and plot a complete series of depression angles in 1.0 deg or 0.5 deg increments, starting at the angle of intrusion and continuing through 0 deg on the zero reference line.

This will result in a plot of one half of the lobe tip path inside of Rotor No. 1. The two sides of the E path are symmetrical, and the upper half of the figure may be obtained by making a reverse trace of the lower portion.

Therefore, after plotting a single tip path, center two of these E paths on radial extensions from the center of rotor 30 containing cavity 40 being designed. Orient these extensions with the same angles of elevation and depression as those of the mating lobe tips.

A motor profile simulator and graphic plotter is a very efficient means of generating and reproducing these E paths. This device consists of two circular plates mounted on shafts to rotate and simulate the end or profile view of two rotors 30. The plates are preferably gear connected. The two plates counter-rotate with their pitch surfaces in near contact. Both plates bear circular protractors which indicate the angular position of the plates. When such a gear coupled device is rotated the two plates counter-rotate in exact synchronization and the tip path of a radial extension from one of the plates may be readily plotted on the other plate.

LOBE AND CAVITY DESIGN CONSIDERATIONS

Referring to FIG. 6A, the following factors are to be considered when designing lobes and cavities:

1. The power of the motor is directly proportional to the height of lobes 34.

2. Increasing the lobe height increases the cavity depth and width.

3. Increasing the lobe width greatly increases the cavity width.

3. The total cavity volume should be minimized to reduce the volume of working fluid wasted. This working fluid produces no torque when it is exhausted.

Therefore, for a given horsepower requirement, the tip and body widths should be minimized consistent with structural strength requirements.

4. The cavity sides must fall well outside of the outermost portions of the two E paths plotted to allow unrestricted outflow of the working fluid as the lobe progresses through the cavity.

5. All of the E paths plotted for a given lobe height and pitch radius have the same size and shape. Therefore it is necessary to plot only one E path and orient the two E paths in rotor 30 which contains cavity 40.

OPERATION OF PREFERRED EMBODIMENT

Referring now to FIGS. 1, 2, and 3, the preferred embodiment of this invention is a multiple-expansion steam prime mover as shown in FIGS. 1, and 3. The motor shown in FIG. 1 has partitions between each section, and uses one shaft to support all of the rotors on the right side and another shaft to support all of the rotors on the left side. The open-view portion shows one of the two low pressure sections used.

FIG. 2 shows a diagrammatic sectional view of one section of the motor as seen from the front with timing gears 32, fore wall 23 and front half of the section removed. This motor will perform well as a single section, but efficiency dictates a multiple-expansion motor used with a condenser. FIG. 3 shows the stage sequence of high pressure steam or any other compressible working fluid entering the high pressure stage at the aft end of motor 20 and flowing through motor 20 in FIG. 1. The volumetric expansion ratios shown are average values. The ratio of the volumes of the intermediate and low pressure stages to that of the high pressure stage varies somewhat and is dependent upon motor horsepower and loading.

Referring to FIGS. 1 and 2, the steam enters inlet port 24 and immediately applies full head pressure to two lobes 34 as shown. The torque produced appears on shafts 28 which transmit it for external use. This device continuously applies full head pressure to two lobes 34 regardless of cyclic stage. Casing 22 confines the pressurized working fluid, and surrounds two or more rotors 30. An annular space is provided around rotors 30 in which lobes 34 move and maintain a seal without contact between the outer surface of lobes 34 and the inner surface of casing 22. Timing gears 32 are used to ensure that lobes 34 and cavities 40 mate precisely. Lobes 34 confine the pressure applied to them, acting as a moving wall before this pressure and transmitting torque to shafts 28. A high pressure zone exists in the space between inlet port 24 and rotors 30. A lower pressure zone exists between outlet port 26 and rotors 30.

A constant seal must be maintained to prevent leakage of the working fluid between these two zones. Therefore, appropriate clearances, typical in steam turbines for like temperatures and pressures, must exist after temperature expansion normalization between all parts which have this pressure difference across them. This includes appropriate clearance between lobes 34 and inner surface of casing 22, and between walls 23 and 25 and the ends of rotors 30 and lobes 34.

This design can be best understood by observing the passage of a lobe 34 through a cavity 40 while maintaining a pressure seal. Referring to FIG. 4A, seal is made between the two rotors 30 at the zero reference line. Cavity rotor 30 on the left rotates counter-clockwise and lobe rotor 30 on the right rotates clockwise at the same rate. Lobe 34 moves toward cavity 40.

Figure 4B:
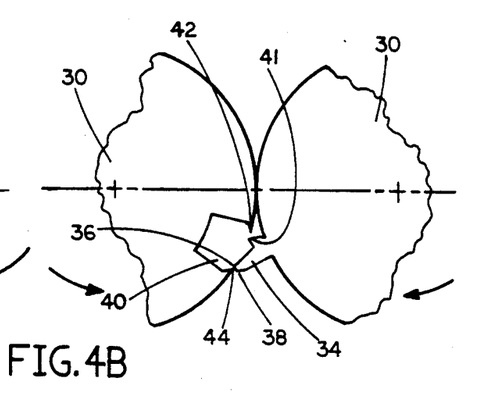

In FIG. 4B, seal is made between the two rotors 30 at the zero reference line. Lobe leading tip 36 enters cavity 40 and lobe lagging tip 38 is separated from cavity lagging tip 44 by the operating clearance selected.

Figure 4C:
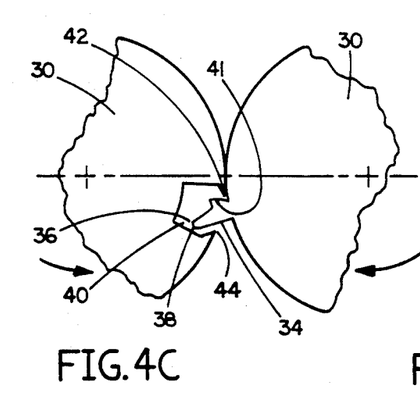

In FIG. 4C, seal is still made between the two rotors 30 at the zero reference line. Cavity leading tip 42 is traveling toward the base of lobe shoulder 41, and lobe 34 is swinging up into cavity 40. The working fluid in the cavity space above lobe 34 is being compressed by the intruding lobe, and the displaced fluid moves around lobe lagging tip 38 and out of the cavity.

Figure 4D:
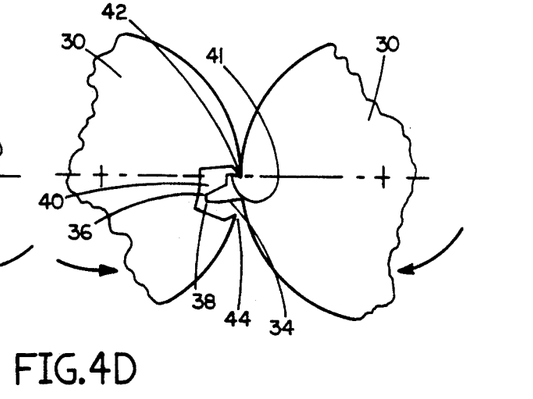

In FIG. 4D, cavity leading tip 42 has just broken seal with the pitch surface of rotor 30 and is now making seal with the upper surface of lobe shoulder 41. Displaced working fluid continues to escape around lobe lagging tip 38.

Figure 4E:
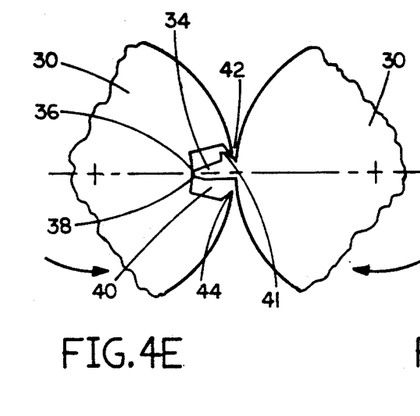

In FIG. 4E, seal is made between cavity leading tip 42 and the surface of lobe shoulder 41.

Figure 4F:
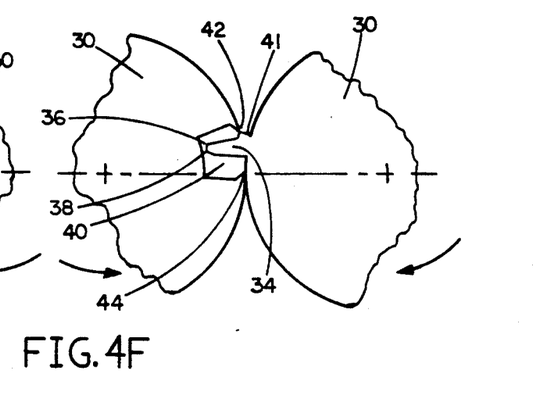

In FIG. 4F, two events occur simultaneously. Cavity leading tip 42 having traveled the length of lobe shoulder 41, now breaks seal with lobe shoulder 41. At the same instant, cavity lagging tip 44 makes seal with the pitch surface of rotor 30. When cavity leading tip 42 moves free from the corner of lobe shoulder 41, high pressure working fluid rushes around the apex of lobe 34 and fills the entire cavity 40. From this point on until the next lobe 34 enters its mating cavity and reaches the point shown in FIG. 4D, seal is made between the two rotors 30.

Figure 4G:
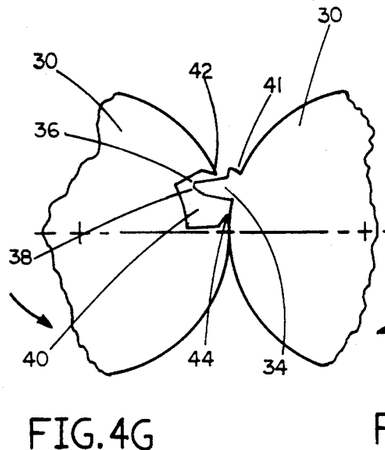

In FIG. 4G, seal is made between the two rotors 30, and lobe 34 swings through cavity 40 with ample separation from the sides of cavity 40. This permits easy flow of the working fluid around lobe 34 and thus prevents the undesirable drag effects of double sealing.

Figure 4H:
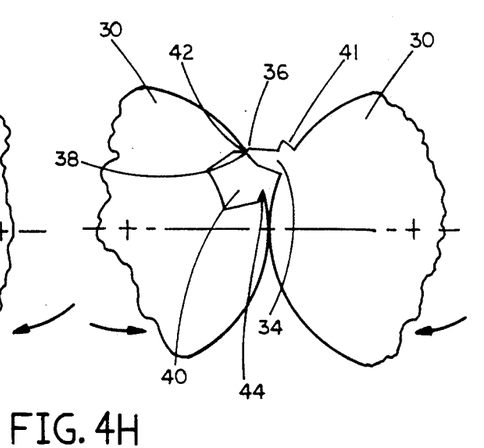

In FIG. 4H, seal is made between the two rotors 30. Lobe lagging tip 38 is separated from cavity leading tip 42 by the operational clearance selected.

Figure 4I:
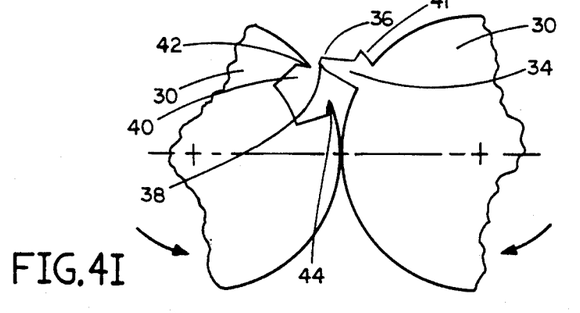

In FIG. 4I, seal is still made between the two rotors 30, and lobe 34 is entirely free of cavity 40. This completes the passthrough.

In FIG. 5, the E paths of both lobe tips are shown to emphasize the need for ample separation between the lobe tips and the sides of cavity 40. The optional curved cavity sides which meet cavity base 46 increase efficiency by reducing the volume of working fluid wasted when cavity 40 reaches the area of outlet port 26. Path A is made by lobe leading tip 36, and path B is made by lobe lagging tip 38. Ample space (3.25 degrees in the example) must be left above path A and below path B to allow the working fluid to move freely around lobe 34 as it moves through cavity 40. This prevents unwanted double-sealing and resistance to the movement of rotors 30.

In FIG. 6A, the path of cavity leading tip 42 around lobe 34 is shown as a dotted line. Lobe shoulder 41 provides an epicycloidal curved sealing surface from the moment cavity leading tip 42 breaks seal with the pitch surface of rotor 30 until seal is made between cavity lagging tip 44 and the pitch surface of rotor 30.

Referring to FIG. 7, the gas motor variation of the invention is shown. Combustion chamber 52 receives combustible fuel via fuel inlet 56, and receives air or oxygen through air/oxygenic inlet 60. In some cases the fuel and air/oxygen mixture may be introduced through a common inlet and air/oxygenic inlet 60 may be eliminated. Igniter 58 ignites the mixture and produces heated gas which expands and exits combustion chamber 52 through exhaust port 62. Heat fins 54 cool combustion chamber 52 by conduction and radiation to the surrounding air.

The operation from this point is identical to that of the preferred embodiment shown in FIG. 2 except that no condenser is used and the exhaust gases from outlet port 26 may be fed into inlet port 24 of a following stage and additional combustion used to eliminate pollutants. Full gas pressure bears continuously on two lobes in the three lobe configuration shown.

CONCLUSION, RAMIFICATIONS, AND SCOPE OF INVENTION

Thus the reader will see that the motor/pump of the invention provides a much simpler, more compact, lighter and more efficient motor than turbines or reciprocating engines.

This motor produces instant full power upon demand. This means full power is available at low speeds. This is a strong advantage over turbine powered submarines and ships in battle when starting up from dead stop. This is also a definite advantage for trains, trucks, and low power shop engines. Power at low speeds and ease of reversing by means of simple valve controls eliminates the need for costly gear reduction and transmission systems. These advantages greatly broaden the scope of use of this invention over the prior art to include use in: power generating stations, submarines, ships, trains, military tanks, trucks, automobiles, and shop motors.

While my above invention contains many specificities, these should not be construed as limitations on the scope of the invention, but rather as an exemplification of the preferred embodiments thereof.

Many other variations are possible. For example, the gas motor device shown in FIG. 7 can supply the power from one shaft to drive the compressor which furnishes air for continuous combustion while the other shaft furnishes the drive power for a power station, automobile or train. This invention can also be used as a pump, compressor or supercharger of expandable fluids and a pump for non-expandable fluids.

This invention could be used as a marine hydro-jet propulsion device by applying power to one of the shafts 28, drawing in water through inlet port 24 and using the jet stream from outlet port 26 for reaction propulsion.

This invention may be used as a stand-alone single stage motor, or several single stage units may sum their power by being coupled to common shafts. Thus, each single stage may take the place of a single cylinder in an internal combustion automobile engine. Such an engine delivers much greater power because all of the stages apply their power continuously rather than one at a time as is the case with individual cylinders in an internal combustion engine.

Another variation for vehicular propulsion would be a rotary motor such as is shown in FIG. 7 with one elongated pair of rotors that would replace the entire internal combustion engine and deliver much greater power.

Accordingly, the scope of the invention should be determined not by the embodiments illustrated, but by the appended claims and their legal equivalents.

I claim:

1. A rotary fluid motor/pump of the lobe and cavity type comprising one or more pairs of rotors tangentially juxtaposed in sealing near contact and mounted on parallel shafts or other support means such as spindles, each of said rotors having a cylindrical pitch surface which is in rolling near contact with the pitch surface of the adjacent rotor, said rotors counter-rotating with the same pitch surface speed, and being surrounded by a casing, said casing having at least one inlet port and one outlet port, said rotors having a plurality of outwardly projecting lobes from said pitch surfaces and a plurality of voids or cavities, extending inwardly from said pitch surfaces, said lobes comprising extensions from said rotors with the radius of each of said lobes equal to the sum of the pitch radius of said rotor and the radial height of said lobe, and terminating in an outer end which is an arc segment drawn from the center of said rotor, each of said lobes having a leading tip and a lagging tip placed at the terminal ends of said arc segment, each of said cavities having a cavity base formed by an arc segment centered on the center of said rotor, each of said cavities provided with a leading tip and a lagging tip at the mouth of said cavity formed at the junctions of said pitch surface of said rotor and each of the sides of said cavity, each of said cavity tips place outside of the paths of said lobe tips and separated from the nearest of said lobe tip paths by the operational clearance selected, and joined to the sides of said cavity in such manner as to provide sufficient space for working fluid to escape around both tips of said lobe, thereby preventing double-sealing drag, wherein an improvement for said lobe comprises:

said lobe improvement being an epicycloidal lobe shoulder which is a part of the leading side of said lobe, extending from said pitch surface of said rotor to make sealing near contact with said cavity leading tip from the time said cavity leading tip breaks seal with said pitch surface of said rotor until said cavity lagging tip makes seal with said pitch surface of said rotor, said lobes having sufficient space provided between the epicycloidal path of said cavity leading tip and the outermost portion of the leading side of said lobe for working fluid to escape freely as said cavity leading tip moves above the lobe side, thereby maintaining constant seal and preventing double-sealing drag, wherein an improvement for said cavity comprises:

said cavity being such that each of said cavity sides and said cavity bases are situated outside of the paths followed by the tips of said lobes, thus avoiding said paths and providing sufficient space for working fluid to escape around the ends of said lobes thus preventing double-sealing drag, said casing provided annular space around said rotors in which said lobes move in sealing near contact with the inner surface of said casing, said rotors in combination with said shafts having a rotational synchronizing means such as timing gears or other means to provide precise meeting of said lobes with said cavities.

2. The rotary fluid motor/pump of claim 1 wherein an improvement comprises the shape of said cavity sides which are essentially curved to parallel the outside paths of said lobe tips, with each of said cavity sides spaced apart from the nearest lobe tip path to provide sufficient room for working fluid to escape freely around both tips of said lobe as said traverses said cavity, thereby preventing double-sealing drag.

3. The rotary fluid motor/pump of claim 1 wherein an improvement comprises minimizing the width of the outer ends of said lobes consistent with structural strength requirements, thereby minimizing the volume of the mating cavities, thus preventing waste of working fluid.

4. The rotary fluid motor/pump of claim 1 wherein the profile of the sides of each cavity is shaped essentially from straight lines, thus simplifying manufacture.

5. The rotary fluid motor/pump of claim 1 wherein the profile of the sides of each cavity has curves in place of angular corners made at the joining of each of said cavity sides and said cavity base, and has curves at the joining of each of said cavity tips and corresponding cavity side, thus preventing structural failure at angular junctions due to vibrational cracking.

6. The rotary fluid motor/pump of claim 1 wherein said pump is externally powered, has water flowing into said inlet port and high velocity water discharged from said outlet port, and is used as a marine propulsion unit or hydraulic pump.

7. A rotary fluid gas motor of the lobe and cavity type comprising one or more pairs of rotors tangentially juxtaposed in sealing near contact and mounted on parallel shafts, each of said rotors having a cylindrical pitch surface which is in rolling near contact with the pitch surface of the adjacent rotor, said rotors counter-rotating with the same pitch surface speed, and having a combustion chamber located to communicate with said rotors through an exhaust port, cited structure being surrounded by a casing, said casing in combination with said combustion chamber having a fuel admission means, a fuel ignition means, and an air/oxygen admission means, said combustion chamber in combination with said casing having cooling means such as heat fins, water jacket, or the like to prevent overheating, said casing having at least one outlet port for exhaust of working fluid, each of said rotors having a plurality of outwardly projecting lobes from said pitch surfaces, and a plurality of voids or cavities extending inwardly from said pitch surfaces, each of said lobes comprising extensions from said rotors, with the radius of each of said lobes equal to the sum of the pitch radius of said rotor and the radial height of said lobe, and terminating in an outer end which is an arc segment drawn from the center of said rotor, each of said lobes having a leading tip and a lagging tip placed at the tips of the terminal ends of said arc segment, each of said cavities having a cavity base formed by an arc segment centered on the center of said rotor, each of said cavities having a leading tip and a lagging tip at the mouth of said cavities formed at the junctions of said pitch surfaces of said rotors and each of the sides said cavities, each of said cavity tips placed outside of the paths of said lobe tips and separated from the nearest lobe tip path by the operational clearance selected, and joined to the sides of said cavities in such manner as to provide sufficient space for working fluid to escape around both tips of said lobe, thereby preventing double-sealing drag, wherein an improvement for said lobe comprises:

said lobe having an epicycloidal lobe shoulder located on the leading side of each of said lobes, extending from said pitch surface of said rotor to make sealing near contact with said cavity leading tip from the time said leading tip breaks seal with said pitch surface of said rotor until said cavity lagging tip makes seal with said rotor, said lobe having sufficient space provided between the epicycloidal path of said cavity leading tip and the outermost portion of the leading side of said lobe for working fluid to escape freely as said cavity leading tip moves above the lobe side, thereby maintaining constant seal and preventing double-sealing drag, wherein an improvement for said cavity comprises:

each of said cavity sides and said cavity bases are situated outside of the paths followed by the tips of said lobes, thus avoiding aid paths and providing sufficient space for working fluid to escape around the ends of said lobes, thus preventing double-sealing drag, said casing providing annular space around said rotors in which said lobes move in sealing near contact with inner surface of said casing, said rotors in combination with said shafts having a rotational synchronizing means such as timing gears or the like to provide precise meeting of said lobes with said cavities.

8. The rotary fluid gas motor of claim 7 wherein an improvement comprises the shape of each of said cavity sides which are essentially curved to parallel the outside paths of said lobe tips, with each of said cavity sides spaced apart from the nearest path of said lobe tips to provide sufficient room for working fluid to escape freely around both tips of said lobe as said lobe traverses said cavity, thereby preventing double-sealing drag.

9. The rotary fluid gas motor of claim 7 wherein the profile of each of said cavity sides is shaped essentially from straight lines, thus simplifying manufacture.

10. The rotary fluid gas motor of claim 7 wherein the profile of the sides of each cavity has curves in place of angular corners made at the joining of each of said cavity sides and said cavity base, and has curves at the joining of each of said cavity tips and corresponding cavity side, thus preventing structural failure at angular junctions due to vibrational cracking.

11. The rotary fluid gas motor of claim 7 wherein an improvement comprises minimizing the width of the outer ends of each of said lobes consistent with structural strength requirements, thereby minimizing the volume of mating cavities, thus preventing waste of working fluid.

* * * * *